United States Patent
Eromaki et al.

(10) Patent No.: US 12,164,216 B2
(45) Date of Patent: Dec. 10, 2024

(54) LIGHT GUIDING ARRANGEMENT AND ELECTRONIC DEVICE COMPRISING SUCH ARRANGEMENT

(71) Applicant: Huawei Technologies Co., Ltd., Shenzhen (CN)

(72) Inventors: Marko Eromaki, Tampere (FI); Mikko Juhola, Tampere (FI); Hong Zhou, Leuven (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 17/760,473

(22) PCT Filed: Feb. 11, 2020

(86) PCT No.: PCT/EP2020/053461
§ 371 (c)(1),
(2) Date: Aug. 10, 2022

(87) PCT Pub. No.: WO2021/160254
PCT Pub. Date: Aug. 19, 2021

(65) Prior Publication Data
US 2023/0076570 A1    Mar. 9, 2023

(51) Int. Cl.
*G03B 17/04*    (2021.01)
*G03B 17/17*    (2021.01)
*H04N 23/55*    (2023.01)

(52) U.S. Cl.
CPC .............. *G03B 17/17* (2013.01); *G03B 17/04* (2013.01); *H04N 23/55* (2023.01)

(58) Field of Classification Search
CPC .......... G03B 17/04; G03B 17/17; G03B 3/06; H04N 23/55
See application file for complete search history.

(56) References Cited

U.S. PATENT DOCUMENTS

| 4,166,683 A | 9/1979 | Ito et al. |
| 2016/0044250 A1 | 2/2016 | Shabtay et al. |
| 2017/0139184 A1 | 5/2017 | Bae et al. |

FOREIGN PATENT DOCUMENTS

| CN | 101010613 A | | 8/2007 |
| JP | H11168645 A | | 6/1999 |
| JP | H11258690 A | * | 9/1999 |
| JP | 2005234470 A | * | 9/2005 |
| JP | 2008505373 A | | 2/2008 |

(Continued)

*Primary Examiner* — Clayton E. LaBalle
*Assistant Examiner* — Fang-Chi Chang
(74) *Attorney, Agent, or Firm* — Slater Matsil, LLP

(57) ABSTRACT

A light guiding arrangement adapted to guide light along a deflection light path, the light guiding arrangement comprising a housing, wherein the housing comprises a light entering area; a light escaping area adapted to transmit guided light to an image sensor; a first lens arrangement arranged in between the light entering area and the light escaping area; and one or more light deflection elements arranged in between the light entering area and the light escaping area. The one or more light deflection elements are adapted to form the deflection light path in between the light entering area and the light escaping area. The housing is formed by two or more operatively interconnected components configured to deform the housing.

20 Claims, 2 Drawing Sheets

(56) References Cited

FOREIGN PATENT DOCUMENTS

| | | | |
|---|---|---|---|
| JP | 2015068841 | A | 4/2015 |
| JP | 2017522611 | A | 8/2017 |
| JP | 2018022123 | A | 2/2018 |

\* cited by examiner

LIGHT GUIDING ARRANGEMENT AND ELECTRONIC DEVICE COMPRISING SUCH ARRANGEMENT

CROSS-REFERENCE TO RELATED APPLICATIONS

This application is a National Stage of International Application No. PCT/EP2020/053461, filed on Feb. 11, 2020, which is hereby incorporated by reference in its entirety.

TECHNICAL FIELD

The disclosure relates to a light guiding arrangement, more particularly to a light guiding arrangement for an electronic device.

BACKGROUND

Recently, camera systems mounted in small mobile electronic devices, such as mobile phones, became more and more advanced and at the same time smaller in size. Cameras are expected to offer an increasing number of features, which features are expected to be incorporated into the same, or an even smaller, space as available before. This leads to major difficulties for developers, since camera systems require certain dimensions in order to provide sufficiently good image sharpness, spatial frequency, sensitivity, etc.

One problem relates to how to provide a camera system for a small electronic device having a very long focal length and/or total track length (TTL). Lens focal length describes the angle of view and magnification properties of a camera. The focal length is a calculation of the optical distance from the point where light rays converge to form a sharp image of an object to a digital sensor at the focal plane in a camera. TTL refers to the distance from the first optical element to the image sensor. The TTL typically depends on the structure and dimensions of the camera system. A further problem relates to the aperture through which light travels into the camera. The aperture determines how much light the lens conveys to the image sensor. A wide aperture enables, for example, taking pictures also in low light situations.

Thus, it can be derived that the optical arrangement of a camera system is limited by static and fixed camera dimensions. As already mentioned, when the camera is integrated into a mobile electronic device, the size of the camera is, in turn, limited by the dimensions and structure of the electronic device.

Due to the fixed structure, the aperture size and zoom properties are restricted by the available space. Therefore, there is a need for a solution that offers better camera properties under limited space conditions.

One known solution in the prior art to provide better zoom properties is to increase the TTL/focal length by arranging zoom lens components horizontally with a periscopic design. In this solution, in order to improve the zoom properties, one option is to increase the TTL/focal length by increasing the length of the camera. Also, in order to improve image quality, the camera size needs to be increased for enabling the use of larger lenses and apertures. Hence, the properties of the normal periscopic optical zoom are still limited by the dimensions of the fixed camera structure.

SUMMARY

It is therefore an object to provide an improved light guiding arrangement. The foregoing and other objects are achieved by the features of the independent claims. Further implementation forms are apparent from the dependent claims, the description, and the figures.

According to a first aspect, there is provided a light guiding arrangement adapted to guide light along a deflection light path, the light guiding arrangement comprising a housing, wherein the housing comprises a light entering area; a light escaping area adapted to transmit guided light to an image sensor; a first lens arrangement arranged in between the light entering area and the light escaping area; and one or more light deflection elements arranged in between the light entering area and the light escaping area, wherein the one or more light deflection elements are adapted to form the deflection light path in between the light entering area and the light escaping area, and wherein the housing is formed by two or more operatively interconnected components configured to deform the housing, such that the deformation of the housing modifies the length of the deflection light path in between the light entering area and the light escaping area.

This solution provides an arrangement for a high zoom factor camera which is mountable in an electronic device, but still provides improved photo quality and zoom properties. The improved zoom properties are achieved by increasing total track length (TTL) and/or focal length. This may be achieved without having to change the physical dimensions of the electronic device. Furthermore, the option of dynamically changing the height of the housing provides a possibility to further increase the TTL and the focal length. The deformation of the housing changes the length of the deflection light path and thus is able to decrease or increase the TTL, enabling improved optical zoom.

In a possible implementation form of the first aspect, the housing has a height extending in a first direction and a width extending in a second direction perpendicular to the first direction, and wherein the deformation of the housing enables the housing to alter between at least a first configuration and a second configuration, the height of the housing is larger in the first configuration than in the second configuration, and the length of the deflection light path is longer in the first configuration than in the second configuration. The change of height of the housing facilitates a change the length of the deflection light path and the TTL. The reason for this is that each mm added to the height of the housing simultaneously adds multiple mm to the TTL due to the angled configuration. Hence, providing the housing with at least two different configurations and heights improves the arrangement and the quality of the images taken by the arrangement in several ways. Being able to set the length of the deflection light path enables the user to simultaneously set the TTL and the focal length, improving optical zoom. Optical zoom has well-known advantages over digital zoom. A larger housing height increases the TTL without requiring a larger camera or electronic device. A smaller housing height allows a reduced size when the camera is not in use, i.e. in a storage mode.

In a further possible implementation form of the first aspect, at least one of the light deflection elements is a light reflection element. This facilitates the possibility of designing the arrangement in accordance with specific reflection requirements.

In a further possible implementation form of the first aspect, the housing comprises at least a first light reflection element mounted on an inner surface of a first operatively interconnected component, and a second light reflection element mounted on an inner surface of a second operatively interconnected component, and wherein the first light reflection element and the second light reflection element are oriented parallel to each other. Introducing two or more reflection elements facilitates folding of the light path more times, further lengthening of the deflection light path and inherently the TTL and the focal length.

In a further possible implementation form of the first aspect, the deflection light path is folded at least once within the housing by means of at least one light reflection element having a reflective surface extending at an angle in the range of 85-950 relative to the first direction. Folding the light path increases the TTL and the focal length, which improves zoom properties.

In a further possible implementation form of the first aspect, the arrangement comprises a first operatively interconnected component and a second operatively interconnected component, and wherein one of the first operatively interconnected component and the second operatively interconnected component is at least partially accommodated by the other operatively interconnected component, and at least one of the first operatively interconnected component and the second operatively interconnected component is configured to move relative to the other operatively interconnected component in the first direction. This facilitates a simple and dynamic housing. Movement of at least one of the operatively interconnected components changes of the height of the housing and/or the position of the deflection element(s) and/or reflective surface(s). Therefore, the movement of at least one of the operatively interconnected components may have an effect on the length of the TTL and focal length.

In a further possible implementation form of the first aspect, the operatively interconnected components are pivotably interconnected such that the width of the housing increases as the height of the housing decreases. This allows a second configuration which has an even smaller height, since the operatively interconnected components may at least to some extent fold onto each other.

In a further possible implementation form of the first aspect, the housing comprises at least one section having a tubular shape, the first lens arrangement is at least partly arranged in the at least one section, and a diameter of the first lens arrangement is larger than the height of the least one tubular section of the housing. This allows an alternative structure for the housing which again can contribute to high-quality phone photography. The use of larger diameter lenses is critical for high sensitivity, which is important in low-light conditions.

In a further possible implementation form of the first aspect, the first lens arrangement is arranged at an angle relative to the first direction, the angle being in the range of 60-90° in the first configuration, and the angle being in the range of 30-60 in the second configuration. The angled placement evokes an angled light path, which facilitates a lengthened TTL and focal length. The angled placement also allows using lenses with larger diameters than the height of the housing, allowing images to be taken, with good quality, in low light conditions. Furthermore, it also provides freedom in designing and setting the arrangement, as the angle of the lens arrangement can be changed.

In a further possible implementation form of the first aspect, at least one point of the first lens arrangement is pivotably interconnected to at least one of the operatively interconnected components, such that the increase in height of the housing increases the angle, and the decrease in height decreases the angle. The possible movement of the first lens arrangement which causes a decrease in the height of the housing allows a reduced storage size of the camera when not in use.

In a further possible implementation form of the first aspect, the first lens arrangement is configured to move linearly within the housing in the second direction, allowing further possible configurations and hence camera improvement possibilities.

In a further possible implementation form of the first aspect, the arrangement further comprises a second lens arrangement adapted to focus light to the image sensor, wherein the second lens arrangement is oriented parallel to the first lens arrangement when the housing is in the first configuration. The introduction of a second lens arrangement facilitates a light guiding arrangement with improved focus as well as improved zoom.

In a further possible implementation form of the first aspect, the arrangement is further adapted to enable at least one reflection of light outside the housing using at least one reflective surface, the reflective surface being provided by an optical element arranged adjacent the light entering area of the housing. This facilitates guiding of the light to the light entering area at an adequate angle in order to provide an adequate TTL and focal length, determined by a user or automatically.

In a further possible implementation form of the first aspect, the optical element is a prism allowing light to be guided to the light entering area using total internal reflection.

In a further possible implementation form of the first aspect, the housing alters between the first configuration and the second configuration in response to user input, allowing a user to change between the modes, and also making it possible to reduce the size of the camera when not in use.

According to a second aspect, there is provided an electronic device comprising a light guiding arrangement and an image sensor. This solution allows an electronic device with small and/or fixed outer dimensions and limited inner space to still have a light guiding arrangement with improved performance, the light guiding arrangement for example being a high telecentric or an optical zoom camera.

According to a third aspect, there is provided a method of modifying the length of a deflection light path within a housing, the method comprising the steps of: a user providing configuration input; and the input generating movement of at least one of several operatively interconnected components of the housing such that the housing is deformed, wherein such deformation of the housing modifies the length of the deflection light path. This solution provides a method for taking high-quality photos with a small size camera with the possibility of using optical zoom.

In a possible implementation form of the third aspect, the method is executed by the light guiding arrangement according to the above.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION OF ILLUSTRATIVE EMBODIMENTS

Figure 1:
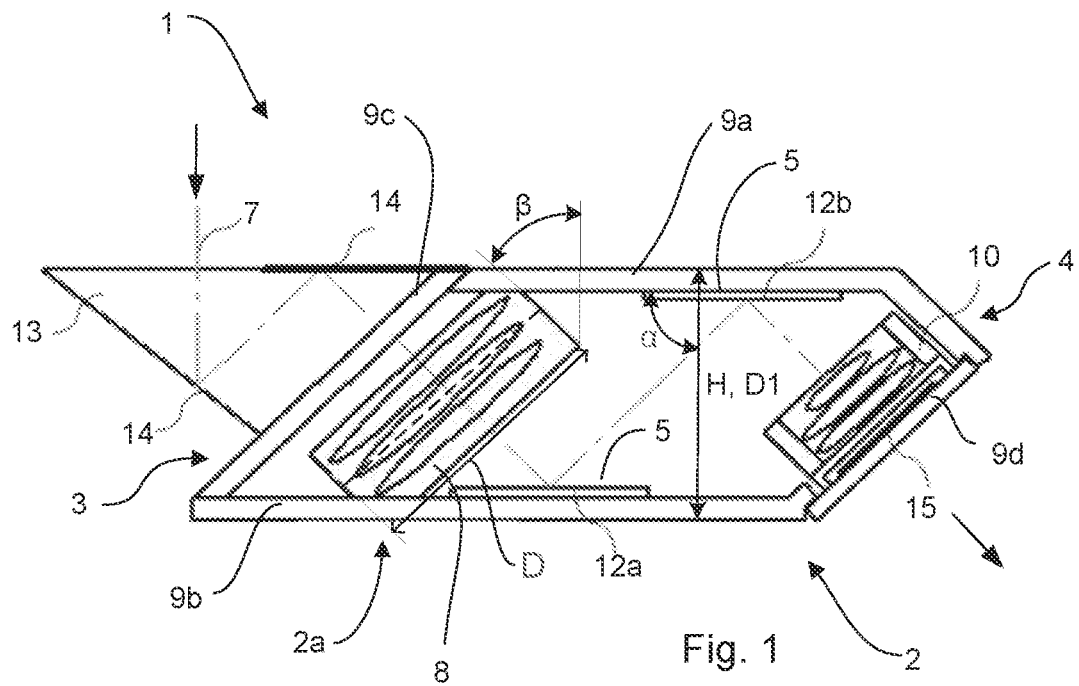
FIG. 1 shows a schematic cross-sectional view of an arrangement according to one embodiment of the present invention.

FIG. 1 illustrates the light guiding arrangement 1, which may be mountable in an electronic device. The device can be any type of electronic device, such as a smartphone, laptop, or tablet. The light guiding arrangement 1 might be a camera or may be mounted in a camera, more particularly a camera for an electronic device. The light guiding arrangement 1 can be at least partially enclosed within a housing of the device. The light guiding arrangement 1 can partially protrude from the housing of the device as the height H increases, for example when optical zoom is used. The electronic device may also include an image sensor 15, the image sensor 15 being operably interconnected to the light guiding arrangement 1. The image sensor 15 can be arranged near a light escaping area 4 of the light guiding arrangement 1. In the embodiment shown in FIG. 1, the image sensor 15 extends in parallel with the plane of a second lens arrangement 10 and the plane of the light escaping area 4. The deflection light path 6 reaching the image sensor 15 may extend parallel to the deflection light path 6 passing through a light entering area 3 of the light guiding arrangement 1.

The light guiding arrangement 1 is able to guide light 7, such as a light ray or light bundle, along the deflection light path 6. The light guiding arrangement 1 comprises a housing 2, which housing 2 preferably comprises a light entering area 3, a light escaping area 4, a first lens arrangement 8 and one or more light deflection elements 12a, 12b. The light entering area 3 may comprise an entrance aperture, be fully circular or almost fully circular, and be parallel to a plane of the first lens arrangement 8. The entrance aperture may also be arranged outside the housing adjacent the light entering area 3. If the light entering area 3 is arranged in an angled position as depicted in FIG. 1, it can allow a wider light entering area 3 than the height H of the housing 2. This enables a deflection light path 6 which is wider than the actual entrance, which also increases the amount of light that reaches the image sensor 15, and thus enables, for example, taking pictures also in low light situations.

Figure 2:
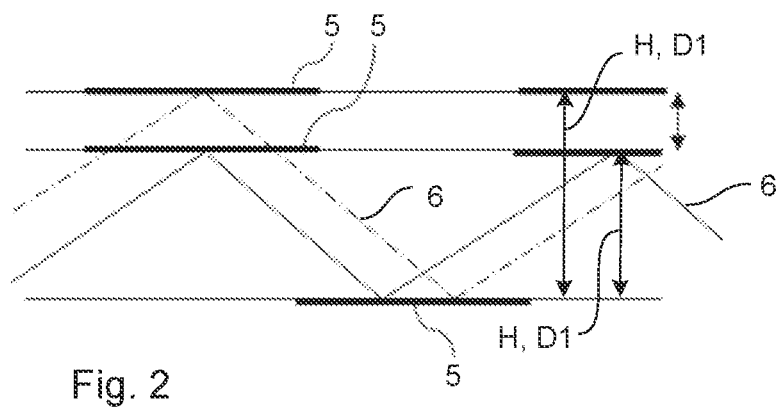
FIG. 2 shows a schematic illustration of a change in length of the deflection light path due to a height change of the housing.

In a preferred embodiment, the light escaping area 4 is adapted to transmit guided light 7 to the image sensor 15. The first lens arrangement 8 is arranged in between the light entering area 3 and the light escaping area 4. The one or more light deflection elements 12a, 12b are arranged in between the light entering area 3 and the light escaping area 4, and are adapted to form the deflection light path 6 in between the light entering area 3 and the light escaping area 4. At least one of the light deflection elements 12a, 12b might be a light reflection element, such as a mirror. The housing 2 is formed by two or more operatively interconnected components 9a, 9b, 9c, 9d, which are able to deform the housing 2. If such deformation of the housing 2 occurs, it modifies the length of the deflection light path 6 in between the light entering area 3 and the light escaping area 4. The deformation and modification of the length of the deflection light path 6 is depicted in FIG. 2. As the length of the deflection light path 6 changes, the height H of the housing 2 and the length of the total track length (TTL) also changes. The TTL is the distance from the point where the light 7 reaches the light entering area 3 to the image sensor 15.

Figure 3A:
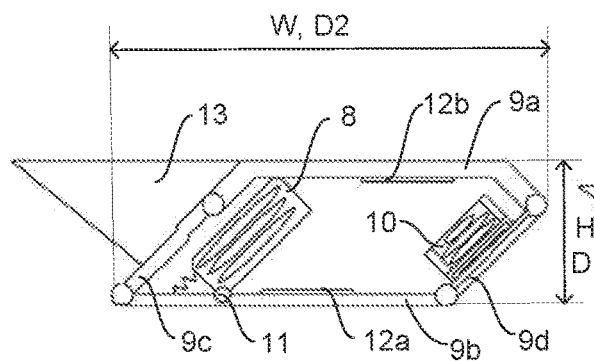
FIG. 3a shows a schematic cross-sectional view of a light guiding arrangement in accordance with one embodiment of the present invention, the light guiding arrangement being in a first configuration.
Figure 3B:
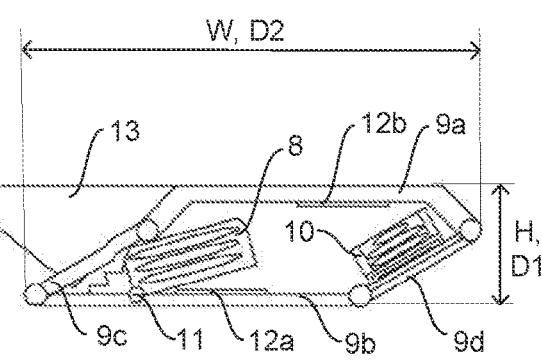
FIG. 3b shows a schematic cross-sectional view of the light guiding arrangement system shown in FIG. 3a, the light guiding arrangement being in a second configuration.
Figure 4A:
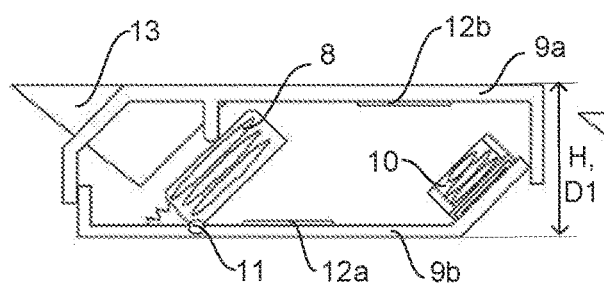
FIG. 4a shows a schematic cross-sectional view of a light guiding arrangement in accordance with one embodiment of the present invention, the light guiding arrangement being in a first configuration.
Figure 4B:
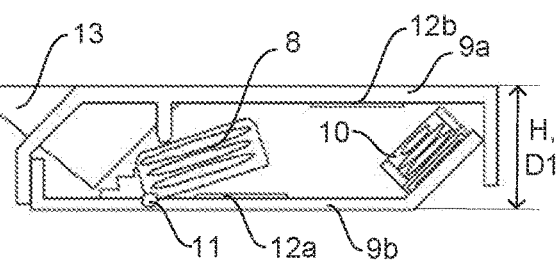
FIG. 4b shows a schematic cross-sectional view of the light guiding arrangement system shown in FIG. 4a, the light guiding arrangement being in a second configuration.

The housing 2 has a height H extending in a first direction D1 and a width W extending in a second direction D2. The second direction D2 is preferably perpendicular to the first direction D1, and the height H is preferably perpendicular to the width W. The deformation of the housing 2 enables the housing 2 to alter between at least two modes, a first configuration and a second configuration. The height H of the housing 2 is larger in the first configuration than in the second configuration, and the length of the deflection light path 6 is longer in the first configuration than in the second configuration. The light guiding arrangement 1 can be in an operational mode when in the first configuration, and in a storage mode when in the second configuration, i.e. when not in use. The light guiding arrangement 1 can be in the second configuration for example when the electronic device is in a pocket or bag. When the light guiding arrangement 1 is needed, the light guiding arrangement 1 may be mechanically expanded before usage. The change between the two configurations can happen automatically or by user input. For this change between the first configuration and the second configuration to happen, different parts of the light guiding arrangement 1 may be adjustable, tiltable, movable, or removable. Furthermore, as already described, the housing 2 is formed by two or more operatively interconnected components 9a, 9b, 9c, 9d, which are able to deform the housing 2 and initiate the movement from first configuration to second configuration and vice versa. FIGS. 3a and 4a illustrate the light guiding arrangement 1 being in the first configuration, while FIGS. 3b and 4b illustrate the light guiding arrangement 1 being in the second configuration.

The housing 2 comprises at least two light deflection elements 12a, 12b, which might both be light reflection elements 12a, 12b. In an embodiment, where there are two light reflection elements 12a, 12b, a first light reflection element 12a is mounted on an inner surface of a first operatively interconnected component 9a, and a second light reflection element 12b is mounted on an inner surface of a second operatively interconnected component 9b. The first light reflection element 12a and the second light reflection element 12 are oriented preferably parallel to each other, i.e. essentially opposite to each other with some offset.

In an embodiment, at least one light reflection element 12a, 12b has a reflective surface 5, which can fold the deflection light path 6 at least once within the housing 2. The reflective surface 5 extends at an angle α in the range of 85-950 relative to the first direction D1, preferably 90° and almost 900, respectively. The reflective surface 5 preferably has a flat surface and is preferably directed towards the inside of the housing 2. If there are more reflective surfaces 5, they are preferably arranged in sequence, separated by air gaps. The reflective surface 5 guides the light 7 in a designed way in order to lengthen the deflection light path 6 and thus increase the focal length and the TTL. As a result, the deflection light path 6 may form a zigzag pattern within the housing 2. In the embodiment illustrated in FIG. 1, two reflective surfaces 5 are placed within the housing 2, and the angle α relative to the height H is about 900 for both reflective surfaces 5.

The reflective surface(s) 5 and/or the light deflection elements 12a, 12b and/or the light reflection element(s) 12a, 12b may be configured to tilt or move during any movement of the housing 2, such as an upward and/or downward movement of the housing 2. This way, the position of the reflective surfaces 5 may be set to appropriate angle(s) designed and/or calculated to provide an intended length of focal length and/or TTL. The adjustment and the setting of the appropriate angle(s) may happen before, during or after taking an image. Furthermore, the reflective surface(s) 5 and/or the light deflection elements 12a, 12b and/or the light reflection element(s) 12a, 12b may be connected to any of the operatively interconnected components 9a, 9b, 9c, 9d, and this connection may be achieved by implementing hinge(s), spring(s), and/or folding arm(s).

The light guiding arrangement 1 comprises a first operatively interconnected component 9a and a second operatively interconnected component 9b. One of the first operatively interconnected component 9a and the second operatively interconnected component 9b is at least partially accommodated by the other operatively interconnected component. At least one of the first operatively interconnected component 9a and the second operatively interconnected component 9b is able to move relative to the other operatively interconnected component 9b, 9a in the first direction D1.

Any number of operatively interconnected components 9a, 9b, 9c, 9d may form the housing 2. In FIGS. 3a and 3b, the housing 2 is formed by four operatively interconnected components 9a, 9b, 9c, 9d, essentially forming a four-bar linkage, preferably a parallelogram linkage, wherein the links/components are interconnected via four pivot points. Components 9c, 9d are pivoted towards or from the plane of component 9b, the distance between component 9a and 9b decreasing or increasing in response thereto. In FIGS. 4a and 4b, the housing 2 is formed by two operatively interconnected components 9a, 9b, where the two operatively interconnected components 9a, 9b are an upper and a lower section that are movable in relation to each other. The operatively interconnected components 9a, 9b, 9c, 9d are pivotably interconnected such that the width W of the housing 2 is able to increase as the height H of the housing 2 decreases. This change in the width W as the height H decreases is depicted in FIGS. 3a and 3b. The interconnection might include hinges or joints that help tilt or fold the housing 2.

The housing 2 may comprise at least one section 2a, that has a tubular shape. The first lens arrangement 8 can be at least partly arranged in the at least one section 2a. A diameter D of the first lens arrangement 8 is preferably larger than the height H of the least one tubular section 2a of the housing 2. The use of the larger diameter can be very useful for photography in low light situations.

Any number of first lens arrangement 8 can be mounted in the housing 2. In one embodiment, the first lens arrangement 8 is arranged at an angle β relative to the first direction D1. In one embodiment, the angle β is in the range of 60-90° in the first configuration, and in the range of 30-60 in the second configuration. Moreover, in the second configuration, the angle β can even be lower than 30°. As an example, the angle β can be 0° when the first lens arrangement 8 is completely laid down.

The angled positioning of the first lens arrangement 8 lengthens the deflection light path 6 despite the fact that the parameters of the housing 2 or the device have not changed. When the height H of the housing 2 also increases, that allows a further increase in the length of the deflection light path 6 so that the TTL and the focal length may be even further increased and thus the quality of the image can be improved.

At least one point 11 of the first lens arrangement 8 might be pivotably interconnected to at least one of the operatively interconnected components 9a, 9b, 9c, 9d. This type of interconnection facilitates the possible movement of the first lens arrangement 8, even during the movement of the operatively interconnected components 9a, 9b, 9c, 9d. This interconnection also allows that the increase in height H of the housing 2 also increases the angle β, and the decrease in height H decreases the angle β.

The first lens arrangement 8 is able to move linearly within the housing 2 in the second direction D2, this movement can be achieved for example by actuators.

The light guiding arrangement 1 may also comprise one or any number of second lens arrangement(s) 10. The second lens arrangement 10 is preferably adapted to focus light 7 to the image sensor 15. In the embodiment illustrated in FIG. 1, the second lens arrangement 10 is oriented parallel to the first lens arrangement 8 when the housing 2 is in the first configuration. When the housing 2 is changing and moving into one of the first or second configuration, the movement of the first lens arrangement 8 and the second lens arrangement 10 may occur in different ranges, at different speed, or at different times, etc. Thus, in the second configuration the first lens arrangement 8 and the second lens arrangement 10 may not be parallel with each other.

Similarly to the first lens arrangement 8, any of the second lens arrangement(s) 10 may also be attached to one of the operatively interconnected components 9a, 9b, 9c, 9d. Furthermore, the first lens arrangement 8 and/or the second lens arrangement 10 may be configured to tilt or move during the movement of any of the operatively interconnected components 9a, 9b, 9c, 9d such that the first lens arrangement 8 and/or the second lens arrangement 10 fit to a thin space. The tilt movement may be implemented, for example, with a folding arm coupled to each first 8 and/or second lens arrangements 10.

In the embodiment of FIGS. 3a and 3b, the first lens arrangement 8 is interconnected to the operatively interconnected component 9b, while the second lens arrangement 10 is interconnected to the operatively interconnected component 9d. In the embodiment of FIGS. 4a and 4b, both the first lens arrangement 8 and the second lens arrangement 10 are interconnected to the operatively interconnected component 9b.

At least one of the lens arrangements 8, 10 may be a focusing lens arrangement. Furthermore, at least one of the lens arrangements 8, 10 may be a zooming lens arrangement. The first lens arrangement 8 is preferably parallel with a plane of the light entering area 3, and the second lens arrangement 10 is parallel with a plane of the light escaping area 4, when the housing 2 is in the first configuration. The first lens arrangement 8 and second lens arrangement 10 are, in other words, preferably perpendicular to the deflection light path 6 passing through the first lens arrangement 8 and second lens arrangement 10.

As in the embodiment of FIG. 1, the light guiding arrangement 1 may be further adapted to enable at least one reflection of light 7 outside the housing 2 using at least one reflective surface 14. The reflective surface 14 might be provided by an optical element 13 arranged adjacent the light entering area 3 of the housing 2. Furthermore, two or more reflective surfaces 14 may be arranged outside of the housing 2. These reflective surfaces 14 may be configured to move and/or tilt as the height H of the housing 2 increases or decreases. For this reason, these reflective surfaces 14 may be fixed by hinge(s) and/or spring(s) and/or folding arm(s) to the housing 2.

The optical element 13 may also be a prism allowing light to be guided to the light entering area 4 using total internal reflection. The prism can include any number of reflective surfaces 14. The reflective surfaces 14 of the prism can steer light 7 entering the prism. The light 7 may enter the prism in an upward, vertical direction. The reflective surfaces 14 may be able to steer the light 7 such that they pass through the first lens arrangement 8 at a perpendicular angle. The prism is preferably a half-penta prism, but may also have any other suitable shape. One or more further reflective surfaces 14 may be arranged adjacent the prism 13.

As mentioned above, the housing 2 may alter between the first configuration and the second configuration in response to user input.

The above-described arrangement may be used for modifying the length of a deflection light path 6 within a housing 2. The method of modifying the length of a deflection light path 6 comprises the following steps: a user provides a configuration input, and then this input generates movement of at least one of several operatively interconnected components 9a, 9b, 9c, 9d of the housing 2 such that the housing 2 becomes deformed. This deformation of the housing 2 modifies the length of the deflection light path 6. This method, as mentioned, may be executed by the light guiding arrangement 1 described above, or any other, possibly similar arrangements capable for fulfilling the steps of the method.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A light guiding arrangement adapted to guide light along a deflection light path, the light guiding arrangement comprising a housing, wherein the housing comprises:
   a light entering area;
   a light escaping area adapted to transmit guided light to an image sensor;
   a first lens arrangement arranged between the light entering area and the light escaping area; and
   a plurality of light deflectors arranged between the light entering area and the light escaping area, wherein the plurality of light deflectors are adapted to form the deflection light path between the light entering area and the light escaping area, and wherein a first light deflector of the plurality of light deflectors and a second light deflector of the plurality of light deflectors are disposed on opposite sidewalls of the housing; and
   wherein the housing is formed by two or more operatively interconnected components adapted to deform the housing, and wherein deformation of the housing modifies a length of the deflection light path between the light entering area and the light escaping area, deformation of the housing causes the first light deflector and the second light deflector to be closer to each other, and a reflective surface of the first light deflector and a reflective surface of the second light deflector are parallel before and after deformation.

2. The light guiding arrangement according to claim 1, wherein a height of the housing extends in a first direction and a width of the housing extends in a second direction perpendicular to the first direction; and
   wherein the light guiding arrangement is configured in a manner that the deformation of the housing causes the housing to alter between at least a first configuration and a second configuration, the height of the housing is larger in the first configuration than in the second configuration, and the length of the deflection light path is longer in the first configuration than in the second configuration.

3. The light guiding arrangement according to claim 2, wherein the two or more operatively interconnected components comprise a first operatively interconnected component and a second operatively interconnected component, and wherein one of the first operatively interconnected component or the second operatively interconnected component is at least partially accommodated by the other of the first operatively interconnected component or the second operatively interconnected component, and at least one of the first operatively interconnected component or the second operatively interconnected component is configured to move relative to the other of the first operatively interconnected component or the second operatively interconnected component in the first direction.

4. The light guiding arrangement according to claim 2, wherein the two or more operatively interconnected components are pivotably interconnected in a manner that the width of the housing increases as the height of the housing decreases as the housing is deformed.

5. The light guiding arrangement according to claim 2, wherein the housing comprises at least one section having a tubular shape, the first lens arrangement is at least partly arranged in the at least one section, and a diameter of the first lens arrangement is larger than a height of the least one section.

6. The light guiding arrangement according to claim 2, wherein the first lens arrangement is arranged at an angle relative to the first direction, the angle being in the range of 60-90° in the first configuration, and the angle being in the range of 30-60° in the second configuration.

7. The light guiding arrangement according to claim 6, wherein at least one point of the first lens arrangement is pivotably interconnected to at least one of the operatively interconnected components in a manner that an increase in the height of the housing increases the angle, and a decrease in the height of the housing decreases the angle.

8. The light guiding arrangement according to claim 2, wherein the first lens arrangement is configured to move linearly within the housing in the second direction.

9. The light guiding arrangement according to claim 2, further comprising a second lens arrangement adapted to focus light to the image sensor, wherein the second lens arrangement is oriented parallel to the first lens arrangement when the housing is in the first configuration.

10. The light guiding arrangement according to claim 2, further adapted to enable at least one reflection of light outside the housing using at least one reflective surface, the reflective surface being provided by an optical element arranged adjacent the light entering area of the housing.

11. The light guiding arrangement according to claim 10, wherein the optical element is a prism adapted to allow light to be guided to the light entering area using total internal reflection.

12. The light guiding arrangement according to claim 2, wherein the housing is configured to alter between the first configuration and the second configuration in response to user input.

13. The light guiding arrangement according to claim 1, wherein at least one of the light deflectors is a light reflector.

14. The light guiding arrangement according to claim 13, wherein the first light deflector is mounted on an inner surface of a first operatively interconnected component and the second light deflector is mounted on an inner surface of a second operatively interconnected component.

15. The light guiding arrangement according to claim 14, wherein light on the deflection light path is reflected at least once within the housing by at least one light reflector having a reflective surface extending at an angle in the range of 85-95° relative to the first direction.

16. An electronic device, comprising:
 a light guiding arrangement; and
 an image sensor;
 wherein the light guiding arrangement is adapted to guide light along a deflection light path, the light guiding arrangement comprises a housing, and wherein the housing comprises:
  a light entering area;
  a light escaping area adapted to transmit guided light to the image sensor;
  a first lens arrangement arranged between the light entering area and the light escaping area;
  a plurality of light deflectors arranged between the light entering area and the light escaping area, wherein the plurality of light deflectors are adapted to form the deflection light path between the light entering area and the light escaping area, and wherein a first light deflector of the plurality of light deflectors and a second light deflector of the plurality of light deflectors are disposed on opposite sidewalls of the housing; and
 wherein the housing is formed by two or more operatively interconnected components adapted to deform the housing in a manner that the deformation of the housing modifies a length of the deflection light path between the light entering area and the light escaping area, deformation of the housing causes the first light deflector and the second light deflector to be closer to each other, and a reflective surface of the first light deflector and a reflective surface of the second light deflector are parallel before and after deformation.

17. The electronic device according to claim 16, wherein a height of the housing extends in a first direction and a width of the housing extends in a second direction perpendicular to the first direction; and
 wherein the light guiding arrangement is configured in a manner that the deformation of the housing causes the housing to alter between at least a first configuration and a second configuration, the height of the housing is larger in the first configuration than in the second configuration, and the length of the deflection light path is longer in the first configuration than in the second configuration.

18. The electronic device according to claim 17, wherein at least one of the plurality of light deflectors is a light reflector.

19. A method, comprising:
 inputting, by a user, a configuration input to a light guiding arrangement, the configuration input causing at least one of a plurality of operatively interconnected components of a housing of the light guiding arrangement to move in a manner that the housing is deformed, wherein deformation of the housing modifies a length of a deflection light path of the light guiding arrangement, and wherein the housing comprises:
  a light entering area;
  a light escaping area adapted to transmit guided light to an image sensor;
  a first lens arrangement arranged between the light entering area and the light escaping area; and
  a plurality of light deflectors arranged between the light entering area and the light escaping area, wherein the plurality of light deflectors are adapted to form the deflection light path between the light entering area and the light escaping area, and wherein a first light deflector of the plurality of light deflectors and a second light deflector of the plurality of light deflectors are disposed on opposite sidewalls of the housing; and
 wherein deformation of the housing modifies the length of the deflection light path between the light entering area and the light escaping area, deformation of the housing causes the first light deflector and the second light deflector to be closer to each other, and a reflective surface of the first light deflector and a reflective surface of the second light deflector are parallel before and after deformation.

20. The method according to claim 19, wherein a height of the housing extends in a first direction and a width of the housing extends in a second direction perpendicular to the first direction; and
 wherein the deformation of the housing causes the housing to alter between at least a first configuration and a second configuration, the height of the housing is larger in the first configuration than in the second configuration, and the length of the deflection light path is longer in the first configuration than in the second configuration.

* * * * *